United States Patent [19]
McKillip

[11] Patent Number: 5,344,305
[45] Date of Patent: Sep. 6, 1994

[54] APPARATUS FOR IN-MOLD LABELLING

[75] Inventor: Barron G. McKillip, Grand Rapids, Mich.

[73] Assignee: CCL Label, Inc., Grand Rapids, Mich.

[21] Appl. No.: 11,818

[22] Filed: Feb. 1, 1993

[51] Int. Cl.$^5$ .................................................. B29C 49/24
[52] U.S. Cl. .................................. 425/503; 264/509; 425/504
[58] Field of Search ............... 425/503, 504, 510, 511, 425/512, 513; 156/267; 264/509, 510, 511, 512, 513

[56] References Cited

U.S. PATENT DOCUMENTS

| 4,662,736 | 5/1987 | Faasse, Jr. | 156/267 |
| 5,082,439 | 1/1992 | Kaminski | 425/504 |

FOREIGN PATENT DOCUMENTS 1220764  4/1987  Canada .

*Primary Examiner*—Tim Heitbrink
*Attorney, Agent, or Firm*—Warner, Norcross & Judd

[57] ABSTRACT

A method and apparatus for in-mold labelling in which labels are individually cut from a continuous web as demanded by the cycling of a mold. The web of labels is advanced through a die cutter which sequentially cuts individual labels from the web. A transfer device picks a freshly cut label from the die cutter and places the label within the cavity of a mold located in proximity to the die cutter. By individually cutting labels from a web at the time of use rather than loading a stack of precut labels in a magazine, the invention allows for the use of thinner, less expensive, and compatible plastic label material.

13 Claims, 1 Drawing Sheet

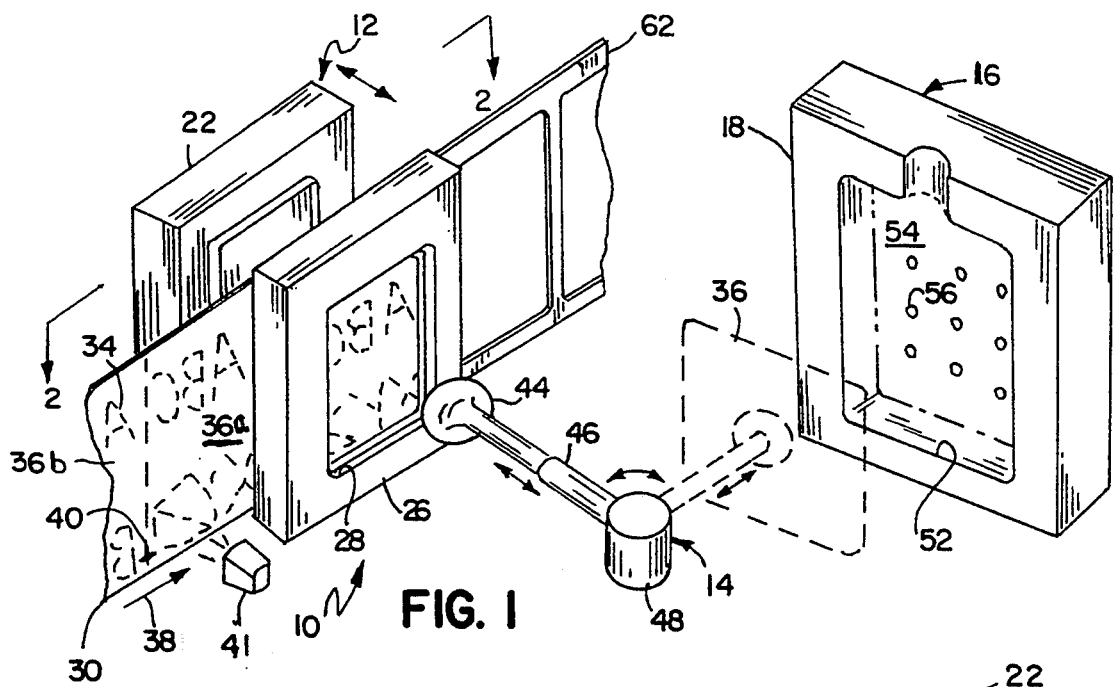
FIG. 1
FIG. 2
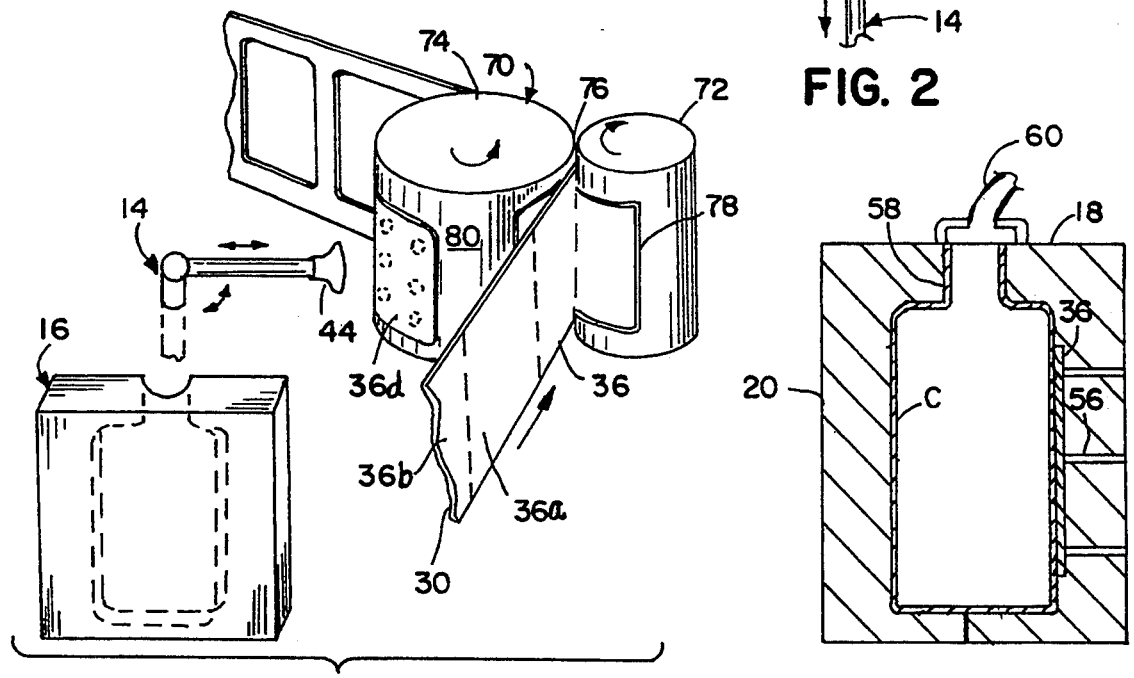
FIG. 4
FIG. 3

APPARATUS FOR IN-MOLD LABELLING

BACKGROUND OF THE INVENTION

1. Field of the Invention

The present invention relates to labelling and, more particularly, to a method and apparatus for feeding labels to the cavity of a mold for adherence to articles formed within the mold.

2. Description of the Related Art

In-mold labels are known in which a label is placed within the cavity of a mold and in which the label becomes adhered to the surface of an article formed within the mold. A typical application is in the production of blow molded containers. A preprinted label with heat activated adhesive is placed against the inner surface of a mold cavity and held by vacuum ports in the mold. The mold is closed, and a plastic blank is heated and inflated within the mold. The hot plastic presses against the label, thus activating the adhesive and causing the label to be adhered to the outer surface of the newly molded container. The mold is opened and the labelled container is ejected from the mold.

In the past, in-mold labels have been furnished as stacks of precut, discrete labels. In the manufacture of such labels, individual oversized labels are printed and piled in a stack. A die cutter cuts through the stack to trim all the labels in the stack to final size. The stack of the precut labels is loaded in a magazine, and a pick and place device, such as a vacuum cup on an articulated arm, engages the frontmost label in the stack, removes the label from the stack, and transfers the label to the interior of the mold where the label is held in position by vacuum holes for adhesion to the container or article to be blow molded.

In the past, paper has been used as the material for precut, stacked in-mold labels. However, the use of paper complicates any recycling of the materials since the paper of the label must be separated from the plastic of the container. Therefore, plastic sheet material has been substituted for paper as the material used for precut, stacked in-mold labels. However, the use of plastic labels in this manner has given rise to other drawbacks.

Plastic sheet material tends to stretch during the printing process and in other handling steps, especially when subject to heat. As a result, the placement of the printed indicia on the sheet may be nonuniform. When the printed sheets are stacked and subsequently die cut in a stack, the indicia on each label may not lie in proper registration with the die cutter and the edges of the cut label.

When plastic labels are stacked and die cut to final size while stacked, the pressure of the die cutter causes the overlying edges of the plastic labels to weld or adhere together, thus making it more difficult to separate and remove single labels from the stack for transfer to a mold.

Plastic material tends to accumulate static electricity which causes the plastic labels to adhere together in the stack, thus complicating the removal of single labels from a magazine. A dusting of corn starch has been used to reduce static electricity, but the corn starch tends to clog the vacuum holes which hold the labels in the molds.

Plastic label material is more expensive than paper. Also, a relatively thicker, stiffer, and more costly plastic sheet material must be used so that the labels are capable of being stacked and die cut as a stack, and of withstanding the handling associated with stacking and dispensing.

Furthermore, the plastic label material must not only have sufficient stiffness, but must also be compatible with the container material. As a resulte, the range of suitable materials is limited.

SUMMARY OF THE INVENTION

The present invention provides a method and apparatus for in-mold labelling using plastic in-mold labels which may be thinner and less costly than labels of the prior art. The labels are readily recyclable along with the container material, and may be made from a wider selection of materials.

According to the invention, in-mold labels are provided as a continuous web of labels joined edge to edge rather than as a stack of precut labels. The web is advanced through a cutting device, such as a die cutter, positioned in proximity to the molding apparatus. Single labels are individually and sequentially cut from the web as demanded by the molding apparatus. Each freshly cut label is picked from the cutting device and transferred into the mold nearby. Since the labels are not cut until needed, and are used immediately after being cut, there is no need for the labels to possess the stiffness or thickness required for precut and stacked labels. As a result, thinner and less expensive material may be used for the labels. Corn starch or other antistatic agents are not required since each label remains free of other labels after cutting. A wider variety of label materials may also be used, such that there may be greater compatibility with the container material.

These and other objects, advantages, and features of the present invention will be more fully understood and appreciated by reference to the written specification and appended drawings.

BRIEF DESCRIPTION OF THE DRAWINGS

FIG. 1 is a diagrammatic, perspective view of an in-mold label apparatus according to the invention and illustrating a labelling method according to the invention;

FIG. 2 is a fragmentary top elevational view taken along the line 2—2 of FIG. 1;

FIG. 3 is a vertical sectional view of a closed blow mold; and

FIG. 4 is a diagrammatic, perspective view of an in-mold label apparatus according to an alternate embodiment of the invention.

DESCRIPTION OF THE PREFERRED EMBODIMENT

By way of disclosing a preferred embodiment, and not by way of limitation, there is shown in FIG. 1 an in-mold labelling apparatus 10 which includes in its general organization a cutting device 12, a label transfer device 14, and a blow mold 16. For clarity of illustration, only one mold half 18 of the blow mold 16 is shown. It is to be understood that a second mold half 20 is used, as shown in FIG. 3, and that the second mold half is movable for opening and closing the mold and for making the interior of the mold accessible for the placement of labels.

As shown in FIGS. 1 and 2, cutting device 12 is provided as a flat bed die cutter having a generally flat, reciprocating die plate 22 formed with a generally rectangular cutting edge 24. A generally flat anvil 26 is spaced apart from the die plate 22 such that a gap is formed between the die plate and the anvil. Anvil 26 is formed with a generally rectangular central opening 28 which opens on one side toward the die plate 22 and on the opposite side toward the transfer device 14.

A continuous web 30 of a series of labels, such as labels 36, 36a, 36b, joined edge to edge passes longitudinally through the gap between the die plate 22 and the anvil 26 in alignment with the opening 28. The web is an indeterminate length of flexible, relatively thin, plastic base sheet material. Before delivery to the die cutter, the front surface 32 has been printed with a series of textual or graphical indicia 34 in registration with the labels 36 to be cut from the web. The rear surface 36 of the web is coated with a heat activatable adhesive, such as ethylene vinyl acetate.

Advantageously, the preprinted and adhesive coated web 30 of labels may be provided in roll form. The roll (not shown) is supported adjacent the cutting device 12 and unwound such that the web passes through the gap of the cutting device in the direction indicated by arrow 38.

Web 30 is advanced by suitable machinery (not shown) intermittently through the cutting device 26. The web is caused to advance, and a label is cut from the web, for each cycle of the mold 16. Suitable control devices are provided for advancing the web in response to the cycling of the mold. Preferably, the web is preprinted with a plurality of registration marks 40 at spacings corresponding to the pitch of the labels on the web. A detection device such as optical detector 41 senses the registration marks and causes the web to stop such that the leading label of the series of labels on the web is in correct registration with the cutting device 12. When a label is in position with respect to the cutting device, die plate 22 moves toward anvil 26 thus cutting the edges of the label 36 and severing the label from the web. The detector 41 may be used to generate a signal to activate the cutting device. The newly cut label 36 is held in position in the opening 28 of the anvil.

Transfer device 14 is a pick and place device including a suction cup 44 mounted at the end of a telescoping tube 46. The opposite end of the tube 46 is mounted to a pivot 48. As an alternative to a telescoping tube 46, pivot 48 may be mounted to suitable machinery which moves the pivot and the suction cup toward and away from the cutting device and the molding device. When a label has been cut by the cutting device and is positioned in the anvil opening 28, the suction cup 44 is pivoted to a position in front of the label and the opening. The tube 46 is telescoped outwardly until the suction cup contacts the rear surface of the label through the opening as shown in FIG. 2 at 50. A vacuum is delivered through the tube 46 to the suction cup such that the label is held against the suction cup.

Tube 46 then withdraws such that the suction cup 44 picks the freshly cut label 36 through the opening 28 and away from the cutting device 12. The suction cup 44 is then pivoted toward the blow mold 16.

Blow mold 16 includes a first mold half 18 formed with a recess 52. The recess of the first mold half mates with a recess of the second mold half 20 to form a cavity in which the container or article will be molded. The surface 54 of the mold recess 52 is provided with several vacuum holes 56. Vacuum holes 56 are disposed over the area of the recess surfaces in correspondence with the portion of the molded article to which the label will be adhered. A suitable source of vacuum is connected to the vacuum holes.

The cutting device 12, transfer device 14, and blow mold 16 are located in proximity to each other such that the transfer device 14 can transfer freshly cut labels directly from the cutting device to the blow mold.

After pivoting toward the blow mold 16, the tube 46 of the transfer device 14 is extended toward the first mold half 18. The suction cup 44 and the label 36 carried by the suction cup enter the recess of the mold. The front surface of the label is placed against the recess surface 54 and held in position by the vacuum holes 56. The vacuum of the suction cup 44 is released and the suction cup is withdrawn from the mold half 18.

As shown in FIG. 3, second mold half 20 is closed against the first mold half 18, and a heated plastic blank is placed in the top opening 58 of the mold. A source of pressurized gas 60 then inflates the blank, causing the blank to enlarge and line the mold cavity, thus forming the container C or other article. The heated plastic comes into contact with the label 36 held in the mold. The heat activates the adhesive on the rear surface of the label causing the label to adhere to the container. The mold is opened and the labelled container is ejected from the mold.

The web of labels 30 is advanced in response to the cycling of the mold by suitable controls so that the next label lies in readiness for cutting and transfer to the mold. A take up reel (not shown) is provided for winding up the skeletal waste matrix 62 of the web 30.

Since each label 36 is individually die cut rather than cut in a stack, the indicia of each label may be precisely and correctly aligned with the cut edges. The plastic base sheet material of the web 30 is not required to withstand stacking, stack cutting, and unstacking, and therefore may be made of thinner and less costly material. Each cut label may be readily removed from the cutting device without the problems of edge welding and static electricity associated with stacks of labels. The use of corn starch and clogging problems is eliminated. The base sheet web plastic material may be selected for compatibility with the container material, and not with regard to a required degree of stiffness and thickness for stacking and unstacking.

An alternate embodiment of the apparatus and method according to the invention is shown in FIG. 4. This embodiment is similar to that shown in FIGS. 1 and 2, except that a drum die cutter 70 is used to cut individual labels 36, 36a, 36b from the web 30 of plastic base sheet material. Drum die cutter 70 includes a die cylinder 72 and an anvil cylinder 74 which cooperate to form a nip 76. The cylinders counterrotate with the web passing through the nip.

The cylindrical surface of die cylinder 72 is formed with a cutting edge 78. Anvil cylinder 74 is provided with a number of vacuum holes 80 distributed over the cylindrical surface of the anvil cylinder. The cylinders are intermittently rotated and the web of labels is advanced as demanded by the cycling of the blow mold 16. The cutting edge 78 of the die cylinder 72 cuts the edges of a label and severs the label from the web 30. The vacuum holes 80 of the anvil cylinder contact the rear surface of the label and pull the label from the skeletal waste 78 of the web.

As shown in FIG. 4, the anvil cylinder 74 may be made with a diameter greater than the diameter of the die cylinder 72. A previously cut label 36d may be carried on the cylindrical surface of the anvil cylinder. The anvil cylinder rotates such that a cut label 36d is placed adjacent to the suction cup 44 of the transfer device 14. The transfer device is activated so that the suction cup removes the label 36d from the anvil cylinder and transfers the label into the interior of the mold 16 as described above.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. An in-mold labelling apparatus comprising:
    a mold having a mold cavity;
    a cutting device in proximity to said mold for serially cutting individual labels from a continuous web in response to a molding cycle of said mold;
    means for advancing a continuous web of a series of individual labels through said cutting device, whereby individual labels are cut serially from said web;
    means for picking an individual cut label directly from said cutting device and placing said individual cut label directly into said mold cavity.

2. The apparatus of claim 2 wherein said cutting device comprises a die cutter.

3. The apparatus of claim 2 wherein said die cutter includes first and second elements, said web passing between said first and second elements, said first element having an opening formed therein whereby a freshly cut label is disposed within said opening, and whereby said means for picking removes said freshly cut label through said opening.

4. The apparatus of claim 2 wherein said die cutter includes first and second cylindrical elements having cylindrical surfaces in counterrotating, nipping relationship, said web passing between said first and second elements.

5. The apparatus of claim 4 wherein said first element includes means for holding a freshly cut label on the cylindrical surface of said first element.

6. The apparatus of claim 1 wherein said means for picking and placing comprises a suction element movable between a first position in which said suction element engages a cut label at said cutting device and a second position in which said suction element places a cut label in said mold cavity.

7. The apparatus of claim 1 further comprising means for detecting the location of each label on said web and for positioning each label in proper registration with said cutting device.

8. An apparatus for feeding in-mold labels to the cavity of a mold comprising:
    a cutting device disposed in proximity to the mold for sequentially cutting individual labels from a series of labels on a continuous web;
    means for advancing a continuous web of labels through said cutting device;
    means for sequentially and individually transferring cut labels from said cutting device directly to the cavity of the mold as required by each molding cycle of the mold, said means for transferring being in proximity to said cutting device and the mold such that the labels are transferred directly from said cutting device to the mold.

9. The apparatus of claim 8 wherein said cutting device comprises a flat plate die cutter.

10. The apparatus of claim 9 wherein said flat plate die cutter includes a first plate having an opening formed therethrough, whereby each cut label is positioned in said opening for engagement with said means for transferring.

11. The apparatus of claim 8 wherein said cutting device comprises a cylindrical die cutter having a first cylinder, said first cylinder including means for holding each cut label on said first cylinder for engagement with said means for transferring.

12. The apparatus of claim 8 wherein said means for picking and placing comprises a suction element movable between a first position in which said suction element engages a cut label at said cutting device and a second position in which said suction element places a cut label in said mold cavity.

13. The apparatus of claim 8 further comprising means for detecting the location of each label on said web and for positioning each label in proper registration with said cutting device.

* * * * *